United States Patent [19]
Paleologos

[11] 3,820,516
[45] June 28, 1974

[54] ROTATING INTERNAL COMBUSTION ENGINE

[76] Inventor: Constantin Paleologos, 14 Navarinow St., Athens, Greece

[22] Filed: July 15, 1971

[21] Appl. No.: 129,711

[52] U.S. Cl. .............................. 123/8.47, 418/36
[51] Int. Cl. ........................................ F02b 53/00
[58] Field of Search ..................... 123/8.47; 418/36

[56] References Cited
UNITED STATES PATENTS

| | | | |
|---|---|---|---|
| 3,256,866 | 6/1966 | Bauer | 418/36 X |
| 3,398,643 | 8/1968 | Schudt | 123/8.47 X |
| 3,483,578 | 12/1969 | Harrison | 123/8.47 X |

FOREIGN PATENTS OR APPLICATIONS

| | | | |
|---|---|---|---|
| 739,726 | 11/1932 | France | 123/8.47 |
| 933,782 | 1/1948 | France | 123/8.47 |
| 319,415 | 7/1934 | Italy | 418/36 |

*Primary Examiner*—Carlton R. Croyle
*Assistant Examiner*—Michael Koczo, Jr.
*Attorney, Agent, or Firm*—Constantin Paleologos

[57] ABSTRACT

A four piston rotary internal combustion type engine, with diametrically opposite pistons in pairs, each pair fixed on each one of two toothed disks, the later alternately in mesh with two sectional gears, mounted on a shaft (the output shaft) for controlling disks' i.e. pistons' movement and for transmitting the energy.

1 Claim, 7 Drawing Figures

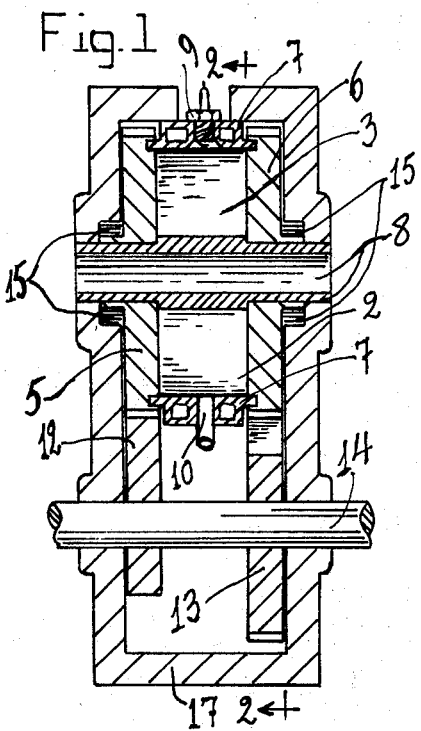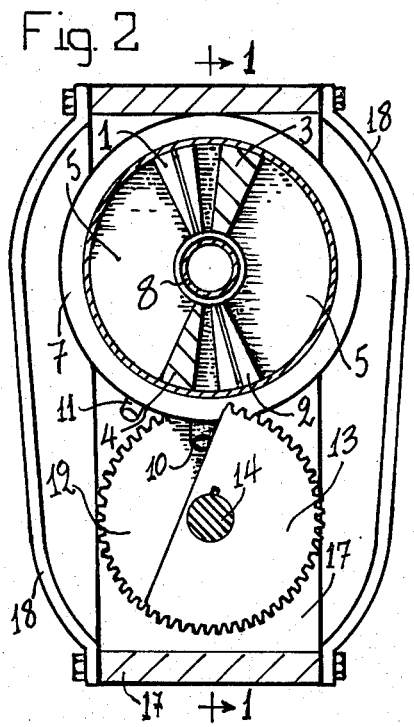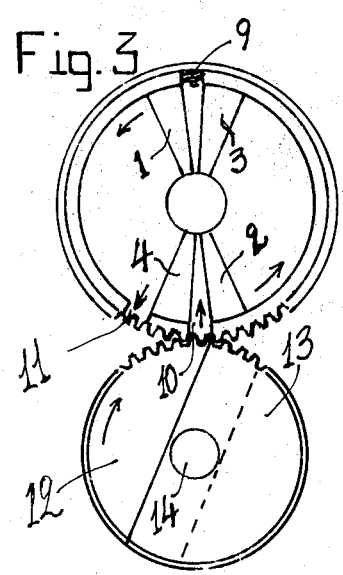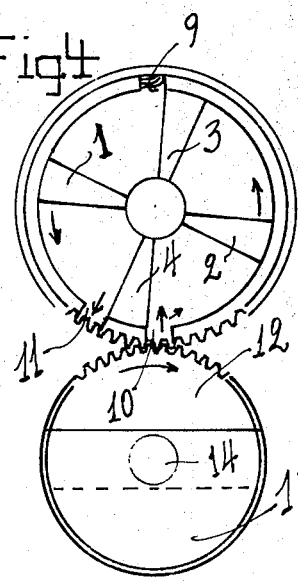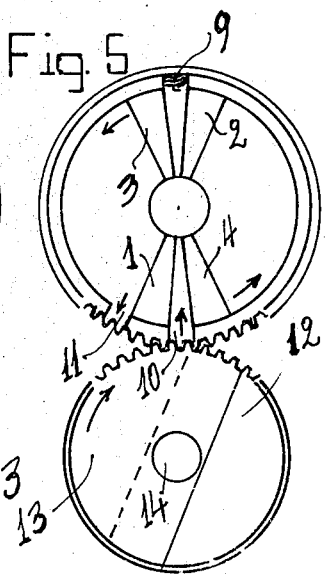

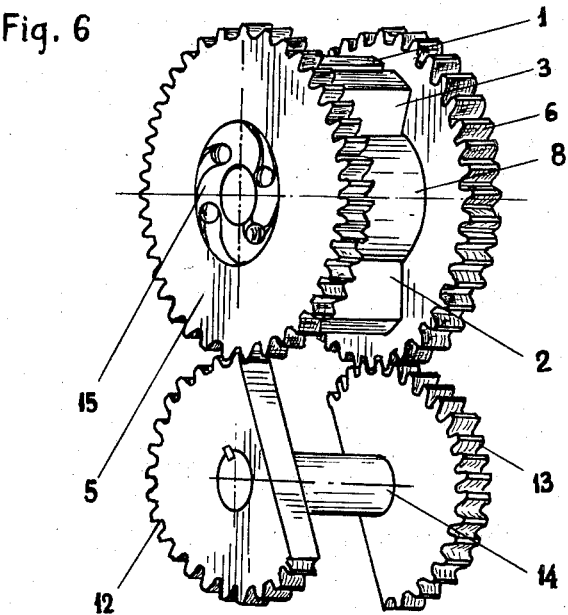
Fig. 6
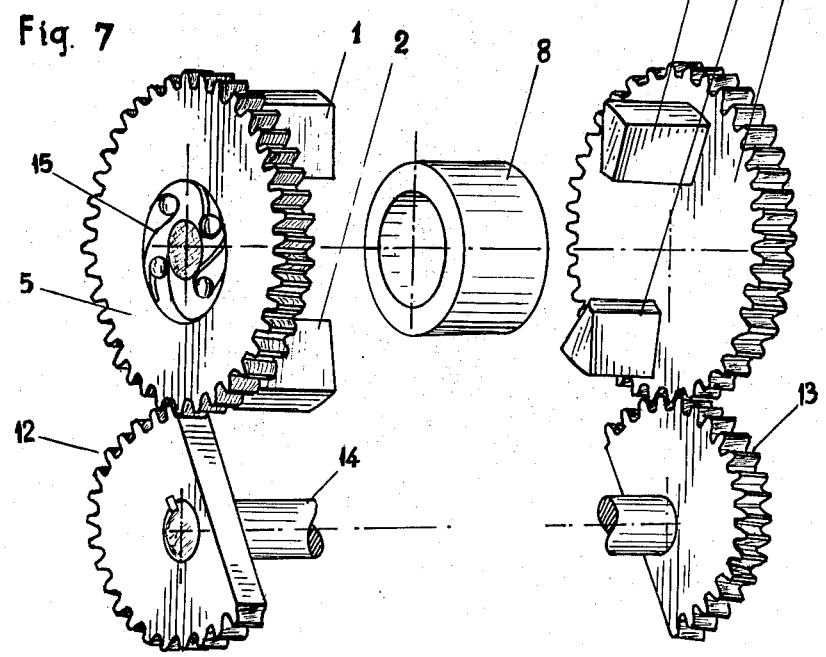
Fig. 7
Fig. 8

ROTATING INTERNAL COMBUSTION ENGINE

The invention herein disclosed is a rotary piston engine, simple, compact, having few operating parts, low cost manufacture, operation and servicing, with easy access to the mechanism and all the inherent advantages of the simple rotary movement.

Special object of the invention has been to simplify the control and transmission mechanism as usually encountered in rotary engines and consequently to utilize maximum efficiency.

The present invention may be considered as an embodiment consisting of four vane type pistons conforming to the cross section of an annular working channel with constant cross section which is formed by an outer cylinder enclosing a cylindrical chamber and by a second inner cylinder. As covers to the cylindrical chamber are provided two toothed disks. A pair of said pistons is fixed on each disk for rotation about the chamber axis, i.e. two diametrically opposed pistons are carried by each one of the disks.

A novel feature of this arrangement therefor is the elimination of the piston carrying shaft.

The outer cylinder is provided with a spark plug recess or other suitable device for igniting the fuel, one inlet port and one exhaust port. The two pairs of the diametrically opposed pistons, first one and then the other is held stationary, while the other will rotate relatively thereto, thus providing for alternately contracting and expanding spaces between them. A combustion fuel mixture is fed into the space between two pistons as the one moves away from the other and the fuel is then compressed as the other moves toward to the first. At maximum compression, ignition of the fuel mixture forces the first rapidly apart. The following piston is held stationary and the leading piston moves forward through an arc of about 108°. The following piston now will be compelled to move forward together with the leading piston, until it arrives to the position where, in the back of it, a new ignition occurs which forces it rapidly forward, while the expansion force exerted on the face of the next piston, in combination with a nonreverse clutch, holds it stationary. The burned gases, in the space in front of the rotating piston, will be squeezed out by its motion. During the course of rotation through 360°, the four spaces between the pistons each expand and contract twice. In each space during each cycle, a fuel mixture is taken in, compressed between the pistons and ignited. The expansion of the ignited fuel forces the pistons apart, after which they again move successively toward each other to exhaust the spent gases. For effecting this synchronization are provided two sectional gears. The teeth of the one sectional gear are still in mesh with the teeth of the one disk, when the teeth of the other sectional gear come in mesh with the teeth of the other disk and compel it to move. Thus both disks, i.e. pairs of pistons, are in motion until the one pair replaces the other in its previous position. This is the exact moment of the ignition. The power impulse created between the pistons forces the leading piston to move forward while the following piston will be held stationary by the expansion force exerted in front of it. At this moment the teeth of the following piston carrying disk enmeshed with the teeth of the corresponding sectional gear lose their contact and the revolution of the sectional gear carrying shaft is continued unhindered forth. Thus, the expansion force acts also as a control factor in combination with the transmission gearing and the nonreverse clutch, so that a restrain mechanism is avoided. It is obvious that by the choice of appropriately dimensioned sectional gears the common rotation and thereof the desired approach and separation of the pistons can be readily selected.

To minimize wear and failure caused by shock loads, it is preferable to increase the whole teeth number for distributing load over a considerable number of teeth. The drawings accompanying, upon reference to the following description will make apparent the true intent of the invention. Structure modifications may be possible within the scope of the invention, as hereinafter defined and claimed.

FIG. 1 is a sectional view of an embodiment of the invention with the beaming support, taken along line 1—1 of FIG. 2.

FIG. 2 is a cross sectional view showing the outer housing, the water-jacketed cylinder, the working annular channel with the pistons therein, and the sectional gears of the transmission gearing.

FIG. 3 to 5 are cross sectional views illustrating successive phases of movement of the pistons and the transmitting gearing.

FIG. 6 is a perspective view of pistons, disks, and sectional gears on their carrying shaft.

FIG. 7 is a similar view showing the component parts of such an arrangement.

The embodiment of the invention illustrated in FIG. 1 and 2 has an outer housing 18 which is shown in FIG. 2, and serves as a grease-box, enclosing the substantially cylindrical chamber in which four vane type pistons 1, 2, 3, 4, FIG. 2, are shaped to fit in the annular working channel between the water-jacketed outer cylinder 7 and the inner cylinder 8. As covers to this annular channel are rotatably placed two toothed disks 5 and 6, on either of them a pair of pistons is fixed (i.e. piston pair 1 and 2 on disk 5, FIG. 1, and the other pair 3 and 4 on disk 6) for rotation about the chamber axis. By means of a tubular arbor on the outer sides of the disks, and possibly with an auxiliary shaft slidingly guided through the disks and the inner cylinder, disks are journalled in bearing recesses on the beaming support 17 and are able to rotate independently of each other. A non-reverse clutch e.g. bicycle coaster brakes 15, as illustrated in FIG. 6, may be readily applied, permitting rotation in only the one direction.

As shown in FIG. 2, on the beaming support is held in place, by means of bolts, the outer housing 18.

The chamber is provided with an ignition port 9 in which a spark plug or another suitable device is mounted, an inlet port 10, and an exhaust port 11 which is shown in FIG. 2.

The simple transmission gearing, as it is best shown in FIG. 6 and 7, includes a drive shaft 14 carrying the sectional gears 12 and 13 displaced on it 180° apart. These are in mesh alternately with the disks. This transmission gearing operates simultaneously as a control mechanism to effect the predetermined synchronization of the pistons movement as hereinafter described.

Referring to FIG. 3, when the pistons are in the position shown, a gaseous mixture of combustible fuel has already been compressed between the pistons 1 and 3, a second charge of fresh fuel has been taken in between the pistons 3 and 2, and a charge previously ignited is between the pistons 1 and 4 and is being exhausted through the exhaust port 11, FIG. 2. When the fuel between pistons 1 and 3 is ignited, pressure is exerted on the faces of these pistons which forces piston 1 to move forward and constrains piston 3 to stand stationary. Piston 1 on disk 5 as well as piston 2 rotate as a whole. Consequently, the motion of piston 1 is transmitted by disk 5 to the sectional gear 12 which is enmeshed with disk 5 and rotates on its shaft 14. At the same time, the second sectional gear 13 on the same shaft 14 is just losing the mesh with the immobilized disk 6 and therefore free to rotate.

FIG. 4 illustrates the piston 1 as it moves in the direction of the arrow forcing the spent gases in the front of it, out through the exhaust port. At the same time, a charge of fresh fuel is being sucked in through the intake port 10, FIG. 2, as the space between the pistons 4 and 2 is increased upon the further movement of piston 2, and a charge already taken in is being compressed between pistons 2 and 3. When piston 1 in its further movement approaches the predetermined distance from piston 4, the teeth of sectional gear 13 come again in mesh with the teeth of disk 6 compelling it to rotate together with disk 5, until the piston pair 3 and 4 arrives to the prior position of piston pair 1 and 2.

In FIG. 5, the piston pair 1 and 2 halt now in the position previously occupied by the pair 4 and 3, the sectional gear 12 now being in the position of disengagement in which the ignition of the fuel between pistons 3 and 2 will drive piston 3 and immobilize piston 2. The periods wherein both pairs of pistons are in motion simultaneously permit one of the adjacent pistons, in the vicinity of minimum volume, to replace the other in its position. Thus, each piston functions successively in different manner, respectively to the four working strokes which take place during the revolution of the pistons, or acts as a seal between the exhaust and intake ports during the respective pause periods of the piston pairs.

When both piston pairs are thus operated alternately, the requisite synchronisation of piston movement as well as power transmission to the output shaft is achieved. The output shaft 14 may be extended out through one side of the beaming support. The simple shape of the working channel and the simple rotary movement of the pistons permit effective sealing. "Rings" may be used to the sides and top surfaces of the pistons to provide a substantially gastightseal with the walls of the channel.

What is claimed is:

1. I am requesting that claim 1 be cancelled and amended as follows:

a rotary internal combustion engine comprising a housing means defining a cylindrical chamber with open ends disposed within the housing, means defining an inner cylinder concentrically positioned within said chamber with its ends protruding beyond the open ends of said chamber to be supported by the housing, thus forming an annular working channel, two centrally bored toothed disks journalled on said inner cylinder and positioned to cover the open ends of said cylindrical chamber for rotation about the chamber axis, two pairs of diametrically opposed vane-type pistons, sector shaped to fit in said annular working channel, each pair fixed to one of said disks so that the pistons intermesh but each pair is free to rotate about the chamber axis independently through an angle with relation to the other and in cooperative relation with the wall of the channel, means for permitting one-way rotation of said disks, control gearing for causing said disks to rotate and stand alternately and in the meantime for causing both disks to rotate simultaneously, thus effecting the replacement of rotating and stationary piston pairs, in such manner that the four spaces confined between said pistons are alternately expanded and contracted so that a four-stroke cycle mode of operation is obtained, said control gearing comprising a power output shaft journalled in said housing outside of said cylindrical chamber and parallel to the chamber axis, two sectional gears mounted on said power output shaft in opposite relation to one another, each sectional gear engaging a respective one of said toothed disks so that the alternative rotation of said disks as induced by the expansion force impels the continuous rotation of the power output shaft, means for introducing a fuel-air mixture into said chamber, means for igniting it, and means for exhausting the spent gases, an intake port on the circumference of the chamber at a point between the faces of two adjacent pistons in their closest approach, an ignition device recess between the faces of the diametrically opposite piston pair, an exhaust port at a point adjacent the position of the stationary piston of said first piston pair, which piston acts as a seal in this position between the exhaust port and the intake port.

* * * * *